United States Patent
Iseki et al.

(10) Patent No.: US 9,503,817 B2
(45) Date of Patent: Nov. 22, 2016

(54) SOUND REPRODUCTION DEVICE

(75) Inventors: Akihiro Iseki, Kawagoe (JP); Yoshiki Ohta, Sakado (JP)

(73) Assignee: PIONEER CORPORATION, Kanagawa (JP)

( * ) Notice: Subject to any disclaimer, the term of this patent is extended or adjusted under 35 U.S.C. 154(b) by 16 days.

(21) Appl. No.: 14/387,927

(22) PCT Filed: Mar. 27, 2012

(86) PCT No.: PCT/JP2012/057948
§ 371 (c)(1),
(2), (4) Date: Oct. 10, 2014

(87) PCT Pub. No.: WO2013/145127
PCT Pub. Date: Oct. 3, 2013

(65) Prior Publication Data
US 2015/0043746 A1    Feb. 12, 2015

(51) Int. Cl.
*H04R 1/20*    (2006.01)
*H04R 3/12*    (2006.01)
*H04S 7/00*    (2006.01)
*G06F 3/16*    (2006.01)
*H04R 1/00*    (2006.01)
*H04S 1/00*    (2006.01)

(52) U.S. Cl.
CPC ........ *H04R 3/12* (2013.01); *G06F 3/16* (2013.01); *H04S 7/302* (2013.01); *H04R 2430/03* (2013.01); *H04R 2499/13* (2013.01); *H04S 1/00* (2013.01)

(58) Field of Classification Search
CPC .............. H04R 2499/13; H04R 3/00; H04R 3/12; H04R 5/02; H04R 29/001; H04R 3/04; H04R 1/001; H04R 2430/01; H04R 2227/005; H04R 1/2803; H04R 1/323; H04R 1/345; H04R 2201/109;

USPC .................. 381/86, 59, 302, 97
(Continued)

(56) References Cited

U.S. PATENT DOCUMENTS

| | | | |
|---|---|---|---|
| 2008/0049948 A1* | 2/2008 | Christoph | H04S 7/301 381/86 |
| 2009/0304213 A1* | 12/2009 | Cook | H04S 1/002 381/300 |
| 2011/0058684 A1* | 3/2011 | Ohta | H04S 1/00 381/97 |

FOREIGN PATENT DOCUMENTS

| | | |
|---|---|---|
| JP | 2007-282202 | 10/2007 |
| JP | 2008-203716 | 9/2008 |

(Continued)

OTHER PUBLICATIONS

International Search Report—PCT/JP2014/057948—Jun. 12, 2012.

*Primary Examiner* — Paul S Kim
*Assistant Examiner* — Norman Yu
(74) *Attorney, Agent, or Firm* — Young & Thompson

(57) ABSTRACT

The sound reproduction device is applied to an acoustic space such as a passenger compartment, and controls the levels of the reproduced sounds at two evaluation points set at the seats in the passenger compartment, for example. Specifically, the sound reproduction device controls the phase of the one channel sound signal inputted from external and supplies it to the pair of speakers. The phase control is performed such that the sum of reproduced sound levels at the two evaluation points becomes larger than the sum of the reproduced sound levels at the two evaluation points in a case where the sound signal is reproduced by only one of the pair of speakers, in an entire audible band.

11 Claims, 13 Drawing Sheets

(58) Field of Classification Search
CPC .............. H04R 2201/40; H04R 2201/405; H04R 2205/024
See application file for complete search history.

(56) References Cited

FOREIGN PATENT DOCUMENTS

| | | |
|---|---|---|
| JP | 2008-216623 | 9/2008 |
| JP | 2009-530915 | 8/2009 |
| JP | 4757034 | 6/2011 |

* cited by examiner

- CALCULATE BASED ON DISTANCES FROM CENTER OF TWO EVALUATION POINTS TO EACH SPEAKER

DELAY z[s] = (d1[m] − d2[m]) / c[m/s]
- d1: DISTANCE BETWEEN SP1 ~CENTER M
- d2: DISTANCE BETWEEN SP2 ~CENTER M
- c: SOUND VELOCITY ( ≑ 340[m/s])

DELAY z[s] = (1.06 − 0.83) / 340 = 0.70[ms]

θ (f): PHASE AT EVERY BAND

SOUND REPRODUCTION DEVICE

TECHNICAL FIELD

The present invention relates to a technique of adjusting a level of sound that a listener listens to in an acoustic space such as a passenger compartment.

BACKGROUND TECHNIQUE

There is proposed a technique of adjusting a sound pressure level of reproduced sound in an acoustic space such as a passenger compartment. For example, Patent Reference 1 proposes a technique of correcting a level of reproduced sound at each frequency band by an equalizer thereby to adjust the sound pressure level in accordance with the acoustic space and a listening position. Also, Patent Reference 2 proposes a method of arranging a speaker array including a plurality of speakers and controlling a phase and a sound volume of a sound signal outputted by each speaker, thereby to create a high sound pressure area at a certain position.

PRIOR ART REFERENCE

Patent Reference

Patent Reference 1: Japanese Patent No. 4757034
Patent Reference 2: Japanese Patent Application Laid-open under No. 2011-151559

SUMMARY OF INVENTION

Problem to be Solved by the Invention

Generally, in a passenger compartment, a listener at a driver's seat (i.e., a driver) feels that the sound from a rear speaker is smaller than the sound from a front speaker and is difficult to listen. This is because the sound outputted by the rear speaker is shielded by the seat and reflected by the window.

In order to make the reproduced sound from the rear speaker easy to listen at the driver's seat, there is proposed a method like Patent Reference 1 which utilizes an equalizer to increase the level of the reproduced sound at a certain frequency band. However, there is such a disadvantage that the sound volume is too large for a passenger at the rear seat because the sound volume of the rear speaker is increased.

On the other hand, there is conceivable a method of increasing the sound pressure around the driver's seat by using a speaker array, like Patent Reference 2. However, the method of Patent Reference 2 is unfit for a vehicle because it needs a large system to control a plurality of speakers.

The above is one example of a problem to be solved by the present invention. It is an object of the present invention to provide a sound reproduction device capable of increasing the reproduced sound level at a certain listening position without giving a bad influence to the environment and without requiring a large system.

Means for Solving the Problem

The invention described in claims is a sound reproduction device comprising: a pair of speakers arranged in front of and behind two evaluation points set in an acoustic space; an input unit which receives one-channel sound signal; and a phase control unit which controls a phase of the sound signal and supplies the sound signals to the pair of speakers, wherein the phase control unit controls a phase difference of the sound signals supplied to the pair of speakers such that a sum of reproduced sound levels at the two evaluation points becomes larger than the sum of the reproduced sound levels at the two evaluation points in a case where the sound signal is reproduced by only one of the pair of speakers, in an entire audible band.

The invention described in claims is a sound reproduction method executed by a sound reproduction device including a pair of speakers arranged in front of and behind two evaluation points set in an acoustic space, comprising: an input process which receives one-channel sound signal; and a phase control process which controls a phase of the sound signal and supplies the sound signals to the pair of speakers, wherein the phase control process controls a phase difference of the sound signals supplied to the pair of speakers such that a sum of reproduced sound levels at the two evaluation points becomes larger than the sum of reproduced sound levels at the two evaluation points in a case where the sound signal is reproduced by only one of the pair of speakers, in an entire audible band.

The invention described in claims is a sound reproduction program executed by a sound reproduction device including a pair of speakers arranged in front of and behind two evaluation points set in an acoustic space, making the sound reproduction device function as: an input unit which receives one-channel sound signal; and a phase control unit which controls a phase of the sound signal and supplies the sound signals to the pair of speakers, wherein the phase control unit controls a phase difference of the sound signals supplied to the pair of speakers such that a sum of reproduced sound levels at the two evaluation points becomes larger than the sum of reproduced sound levels at the two evaluation points in a case where the sound signal is reproduced by only one of the pair of speakers, in an entire audible band.

DETAILED DESCRIPTION OF THE PREFERRED EMBODIMENTS

Figure 1:
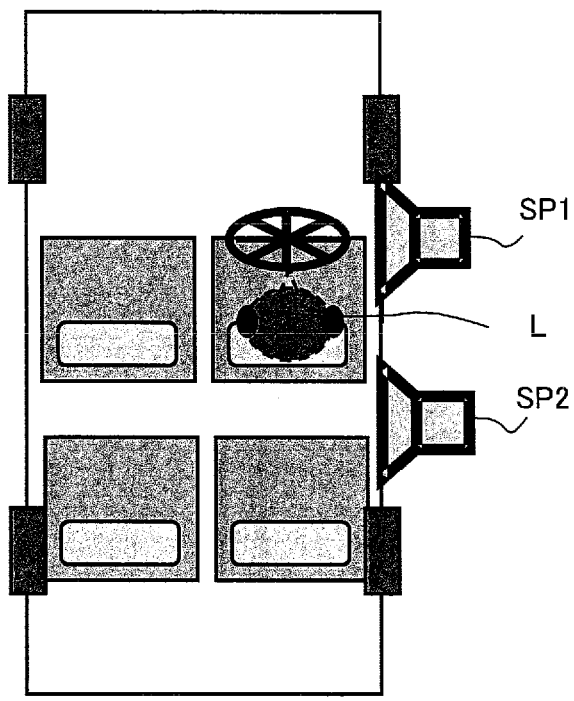
FIG. 1 is a plan view schematically illustrating an environment in a passenger compartment.

According to one aspect of the present invention, there is provided a sound reproduction device comprising: a pair of speakers arranged in front of and behind two evaluation points set in an acoustic space; an input unit which receives one-channel sound signal; and a phase control unit which controls a phase of the sound signal and supplies the sound signals to the pair of speakers, wherein the phase control unit controls a phase difference of the sound signals supplied to the pair of speakers such that a sum of reproduced sound levels at the two evaluation points becomes larger than the sum of the reproduced sound levels at the two evaluation points in a case where the sound signal is reproduced by only one of the pair of speakers, in an entire audible band. In a preferred example, the one of the pair of speakers is the speaker whose sum of the reproduced sound levels at the two evaluation points is smaller.

The above sound reproduction device is applied to an acoustic space such as a passenger compartment, and controls the levels of the reproduced sounds at two evaluation points set at the seats in the passenger compartment, for example. Specifically, the sound reproduction device controls the phase of the one channel sound signal inputted from external and supplies it to the pair of speakers. At that time, the phase control is performed such that the sum of reproduced sound levels at the two evaluation points becomes larger than the sum of the reproduced sound levels at the two evaluation points in a case where the sound signal is reproduced by only one of the pair of speakers, in an entire audible band. Therefore, it is possible to control the reproduced sound to be clearly listened at the position corresponding to the two evaluation points in the acoustic space.

In one mode of the above sound reproduction device, the phase control unit gives the phase difference different at each frequency band to the sound signals supplied to the pair of speakers. By this, even in an environment such as a passenger compartment having complicated acoustic characteristics, the level of the reproduced sound can be increased at the evaluation points in the entire audible band.

In another mode of the above sound reproduction device, the phase difference has a value within ±120 degrees from the phase difference in a case where the sum of the reproduced sound levels at the two evaluation points becomes maximum. By this, the reproduced sounds outputted from the pair of speakers are canceled with each other, and the level of the reproduced sound is prevented from being lowered.

In still another mode of the above sound reproduction device, the phase control unit gives a delay of a fixed delay amount to the sound signals supplied to the pair of speakers in an entire frequency band. In this mode, in an acoustic space such as an anechoic room having simple acoustic characteristics, the level of the reproduced sound can be increased at the evaluation points by a simple phase control.

In still another mode of the above sound reproduction device, one of the pair of speakers is arranged on an opposite side of the other of the pair of speakers with respect to a line segment connecting the two evaluation points. By this, it becomes possible to synchronize the reproduced sounds outputted from two speakers to effectively increase the level.

In a preferred example, the two evaluation points correspond to positions of two ears of a listener positioned at a listening position in the acoustic space. In another preferred example, the sound space is a passenger compartment of a vehicle, the pair of speakers are a front speaker and a rear speaker arranged at a right side or a left side in the passenger compartment, and the two evaluation points correspond to positions of left and right ears of a listener positioned at a front seat in the passenger compartment.

According to another aspect of the present invention, there is provided a sound reproduction method executed by a sound reproduction device including a pair of speakers arranged in front of and behind two evaluation points set in an acoustic space, comprising: an input process which receives one-channel sound signal; and a phase control process which controls a phase of the sound signal and supplies the sound signals to the pair of speakers, wherein the phase control process controls a phase difference of the sound signals supplied to the pair of speakers such that a sum of reproduced sound levels at the two evaluation points becomes larger than the sum of reproduced sound levels at the two evaluation points in a case where the sound signal is reproduced by only one of the pair of speakers, in an entire audible band. By this, it is possible to control the reproduced sound to be clearly listened at the position corresponding to the two evaluation points in the acoustic space.

According to still another aspect of the present invention, there is provided a sound reproduction program executed by a sound reproduction device including a pair of speakers arranged in front of and behind two evaluation points set in an acoustic space, making the sound reproduction device function as: an input unit which receives one-channel sound signal; and a phase control unit which controls a phase of the sound signal and supplies the sound signals to the pair of speakers, wherein the phase control unit controls a phase difference of the sound signals supplied to the pair of speakers such that a sum of reproduced sound levels at the two evaluation points becomes larger than the sum of reproduced sound levels at the two evaluation points in a case where the sound signal is reproduced by only one of the pair of speakers, in an entire audible band. By this, it is possible to control the reproduced sound to be clearly listened at the position corresponding to the two evaluation points in the acoustic space.

Embodiments

[Basic Principle]

First, a basic principle of the preferred embodiments will be described. The embodiments aim to increase the sound pressure level at a specific position in an acoustic space such as a passenger compartment, for example, at the driver's seat. For that purpose, the embodiments utilize a special environment in a passenger compartment.

FIG. 1 is a plan view schematically showing an environment in a vehicle according to the embodiments. In FIG. 1, there are four seats in the vehicle, and a listener L (driver) is seated at the driver's seat corresponding to a listening position. Here, at the right side of the driver's seat, a front speaker SP1 and a rear speaker SP2 are arranged. While a front speaker and a rear speaker are similarly arranged on the left side of the vehicle in an actual vehicle, the illustration thereof is omitted here. As shown in FIG. 1, the embodiments utilize such a special environment of the vehicle that two speakers SP1 and SP2 are arranged at the front side and the rear side in a manner sandwiching the driver's seat. In the embodiments, the sound pressure levels at the left and right ears of the listener L are simultaneously controlled so that the listener L at the driver's seat can easily listen to the reproduced sound.

Generally, the magnitude of the sound perceived by a human being is determined based on a value obtained by summing up the sound intensity at both ears. Namely, a human being perceives the sound of same magnitude when he or she listens to the sound of sound pressure 6 dB by both ears and when he or she listens to the sound of sound pressure 12 dB by one ear. This is pointed out in the following document.

Reference: Hisao Sakai, Takeshi Nakajima, "Hearing and Acoustic Psychology", Corona Publishing, CO., LTD., pp. 173-174, "The sound magnitude listened by both ears is equal to the sound magnitude when the sound pressure levels to both ears are increased by 6 dB and listened by one ear".

Therefore, in the embodiments, the positions of left and right ears of the listener L are set to evaluation points, and the signals inputted to the speakers SP1 and SP2 are controlled such that the sum of the sound pressure levels at those two evaluation points becomes large. Thus, the listener L feels the reproduced sound large.

Figure 2:
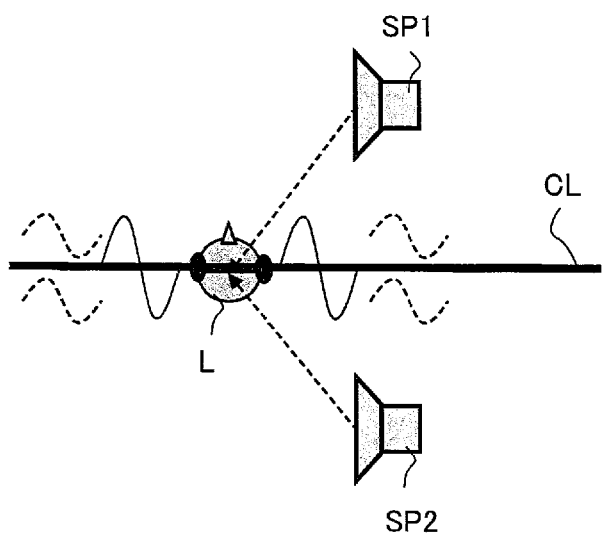
FIG. 2 illustrates an example of arrangement of a listening position and a pair of speakers.

Here, the positional relation between the listener L and the pair of speakers SP1 and SP2 will be studied first. As shown in FIG. 2, in a case where the listener L is positioned on the center line CL at equal distances from the pair of speakers SP1 and SP2 and the both ears of the listener L are on the center line CL, the listener L can listens to the sound outputted by the speakers SP1 and SP2 synchronously. Namely, the sum of the sound pressure levels at both ears of the listener L (hereinafter referred to as "both-ear level sum") becomes maximum. Therefore, if the speakers SP1 and SP2 can be arranged in the positional relation of FIG. 2 with respect to the driver's seat, the both-ear level sum of the listener L becomes maximum by merely outputting the sound signals from those two speakers SP1 and SP2. In this case, it is not necessary to apply any processing or adjustment to the sound signals supplied to the speakers SP1 and SP2.

However, in an actual passenger compartment, two speakers SP1 and SP2 cannot be necessarily arranged in the positional relation of FIG. 2 with respect to the driver's seat. Therefore, in the embodiments, an appropriate phase difference is given to the sound signals supplied to two speakers SP1 and Sp2 so as to maximize the both-ear level sum.

Figure 3A:
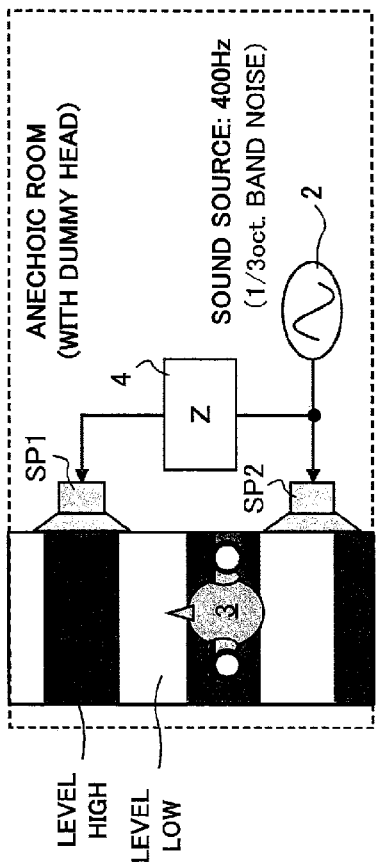
FIGS. 3A and 3B schematically illustrate a method of giving a phase difference to sound signals supplied to two speakers.
Figure 3B:
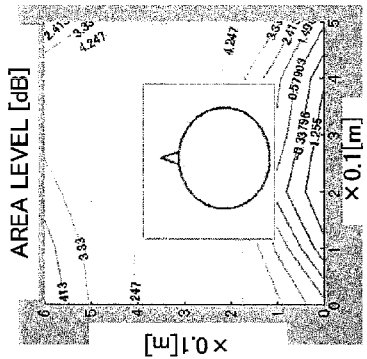
Figure 3B:
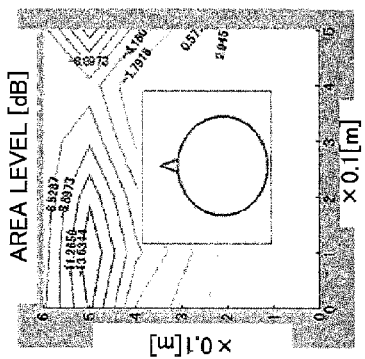
Figure 3B:
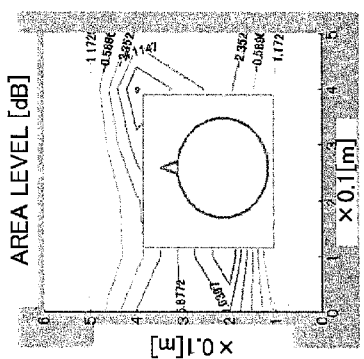
Figure 3B:
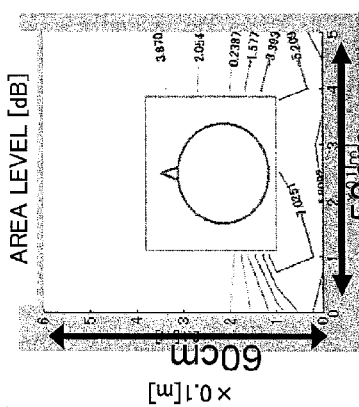

FIGS. 3A and 3B schematically shows a method of giving a phase difference to the sound signals supplied to two speakers SP1 and SP2. FIG. 3A shows a configuration for supplying sound signals to two speakers SP1 and SP2. In an anechoic room, a dummy head 3 is arranged at the listening position, and a front speaker SP1 and a rear speaker SP2 are arranged in front of and behind the dummy head 3 on the right side. The sound signal from the sound source 2 is inputted to the rear speaker SP2 as it is and inputted to the front speaker SP1 after being delayed by a fixed delay amount "Z" in entire frequency band by the delay 4.

As shown in FIG. 3A, in a case where a pair of speakers are arranged in a longitudinal direction, the sound pressure distribution of the reproduced sound outputted by the speakers has lateral stripes due to interference. Specifically, in FIG. 3A, the black areas including the position of the dummy head 3 have the large sound pressure level, and the white areas have the small sound pressure level, thus forming the lateral stripes. Therefore, by varying the delay amount Z, it is possible to vary the levels of both ears synchronously to control the both-ear level sum.

FIG. 3B shows the examples of the sound pressure distribution around the dummy head 3 when the delay amount Z is varied. The value of the contour line indicates the sound pressure level. In the example shown in FIG. 3B, when the delay amount Z=2.0 [ms], the sound pressure level near the both ears of the dummy head 3 becomes the maximum value, 4.247 [dB]. Therefore, the delay amount Z=2.0 [ms] is optimum in this example.

In this way, by arranging a pair of speakers in front of and behind the position of the listener and giving an appropriate phase difference to the sound signals supplied to those speakers, the both-ear level sum of the listener can be increased.

1st Embodiment

Figure 4:
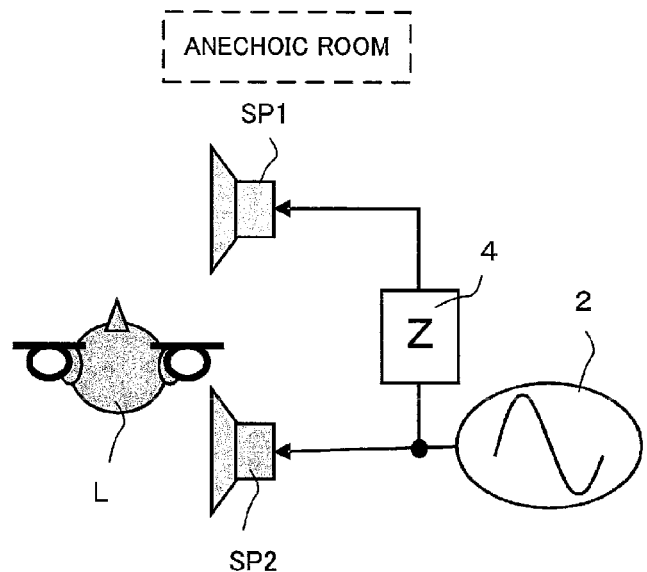
FIG. 4 illustrates a schematic configuration of a first embodiment of a sound reproduction device according to the present invention.

FIG. 4 shows a schematic configuration of a sound reproduction device according to a first embodiment. The first embodiment assumes an anechoic room as the acoustic space.

As shown in FIG. 4, a pair of speakers, i.e., a front speaker SP1 and a rear speaker SP2, are arranged in front of and behind the listening position of the listener L. In this example, the front speaker SP1 is farther than the rear speaker SP2 from the listener L.

The sound signal outputted by the sound source 2 is supplied to the rear speaker SP2 as it is, and is supplied to the front speaker SP1 after being delayed by a predetermined delay amount Z by the delay 4. The delay 4 gives a fixed delay amount Z in the entire frequency band of the sound signal outputted by the sound source 2.

A method of determining the fixed delay amount Z will be described below. The delay amount Z is determined such that the both-ear level sum of the listener L becomes large. It is noted that the positions of the both ears of the listener L correspond to two evaluation points.

Figure 5:
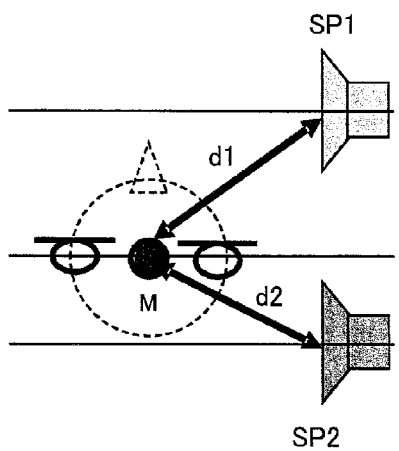
FIG. 5 illustrates an example of a calculating method of a delay amount Z.

The delay amount Z can be determined based on the distances between the positions of the both ears of the listener L and the front and rear speakers SP1 and SP2. FIG. 5 illustrates the method of determining the delay amount Z. Now, assuming that the distance from the center point of the both ears, i.e., the center point M of two evaluation points, to the front speaker SP1 is "d1" and the distance from the center point M to the rear speaker SP2 is "d2", the delay amount Z is given by the following equation:

$$\text{Delay amount } Z = (d1 - d2)/c \,[\text{m/s}] \tag{1}$$

wherein "c" is sound velocity (approximately 340 [m/s]).

Now, assuming in the acoustic space shown in FIG. 4 that the distance d1 from the center point M to the front speaker SP1 is 1.06 m and the distance d2 from the center point M to the rear speaker SP2 is 0.83 m, the delay amount Z is given as follows:

$$Z = (1.06 - 0.83)/340 = 0.70 \,[\text{m/s}]$$

Instead, the delay amount Z can be calculated based on a transfer function between each of the speakers SP1, SP2 and the both ears (two evaluation points) of the listener L.

Figure 6A:
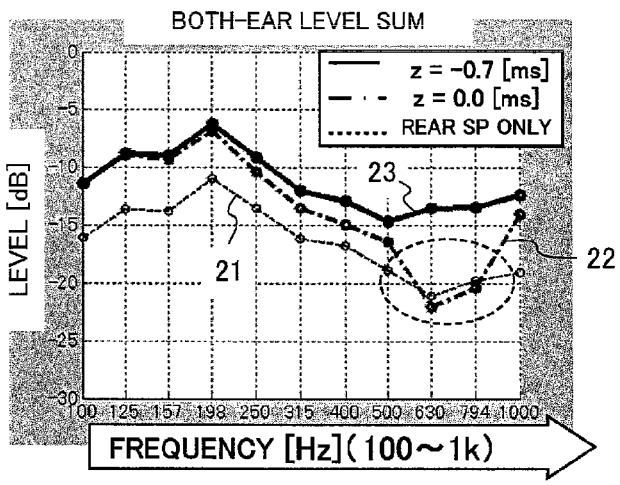
FIGS. 6A to 6C illustrate characteristics in the first embodiment.
Figure 6B:
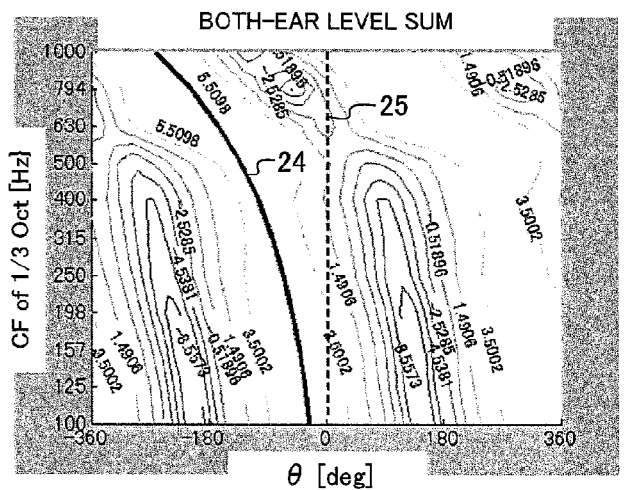
Figure 6C:
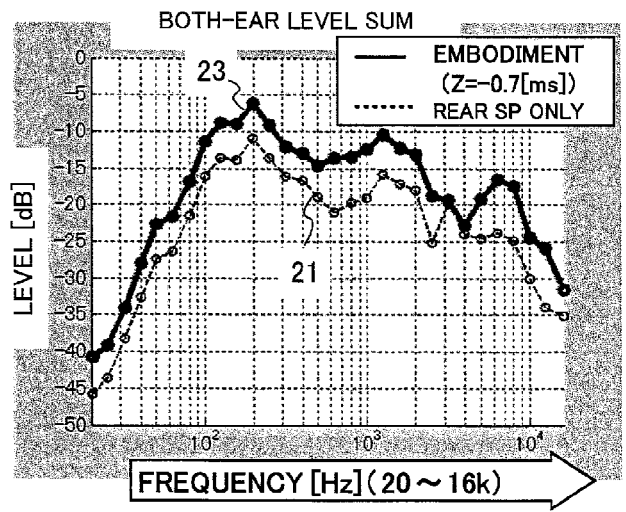

FIGS. 6A to 6C show characteristics in the above case. Specifically, FIG. 6A shows a frequency characteristic of the both-ear level sum. In FIG. 6A, the graph 21 indicates the both-ear level sum in a case where the sound signal is inputted only to the rear speaker SP2. The graph 22 indicates the both-ear level sum in a case where the sound signals are inputted to two speakers SP1, SP2 but no phase difference is given to those sound signals (Z=0.0 [m/s]). The graph 23 indicates the both-ear level sum in a case where the sound signals are inputted to two speakers SP1, SP2 and the phase difference Z=0.7 [m/s] is given to those sound signals. In the graph 23, the sound signal inputted to the rear speaker SP2 is actually delayed from the sound signal inputted to the front speaker SP1 by the delay amount Z.

The both-ear level sum (graph 23) in the case where the sound signals are inputted to two speakers with the phase difference is larger than the both-ear level sum (graph 21) in the case where the sound signal is inputted only to the rear speaker SP2. The both-ear level sum (graph 22) in the case where the sound signals are inputted to two speakers without giving the phase difference is larger than the both-ear level sum (graph 21) in the case where the sound signal is inputted only to the rear speaker SP2 in the frequency range of 100-500 Hz, but is smaller than the both-ear level sum (graph 21) in the case where the sound signal is inputted only to the rear speaker SP2 in the frequency range of 600-800 Hz. This means that, if the sound signals are inputted to two speakers with no phase difference, there is a frequency band in which the both-ear level sum becomes rather small due to the phase relation of the reproduced sound from two speakers. Therefore, in order to increase the both-ear level sum at a desired frequency band, it is necessary to input the sound signals to two speakers with an appropriate phase difference like the graph 23.

FIG. 6B shows the relation of the both-ear level sum with respect to the phase given to the sound signals inputted to two speakers and the frequency of the sound signals. The solid line 24 indicates the both-ear level sum in a case where the phase difference (Z=0.7 [m/s]) is given to the sound signals inputted to two speakers. The solid line 24 passes the area where the both-ear level sum is large. The broken line 25 indicates the both-ear level sum in a case where no phase difference is given to the sound signals inputted to two speakers. The broken line 25 passes the area where the both-ear level sum is large in the frequency range of 100-500 Hz like the graph 22 in FIG. 6A, but passes the area where the both-ear level sum is small in the frequency range of 600-800 Hz. Namely, FIG. 6B also indicates that it is necessary to give an appropriate phase difference to the sound signals inputted to two speakers SP1, SP2 in order to increase the both-ear level sum in an entire frequency band of 100-1 kHz.

FIG. 6C indicates a frequency characteristic of the both-ear level sum in a frequency range of 20-16 kHz, i.e., so-called audible band. Similarly to FIG. 6A, the graph 21 indicates the both-ear level sum in a case where the sound signal in inputted only to the rear speaker SP2. The graph 23 indicates the both-ear level sum in a case where the sound signals are inputted two speakers and a phase difference (Z=0.7 [m/s]) is given to the sound signals. It is understood from FIG. 6C that the both-ear level sum can be increased in the entire audible band by giving an appropriate phase difference to the sound signals inputted to two speakers.

2nd Embodiment

Figure 7:
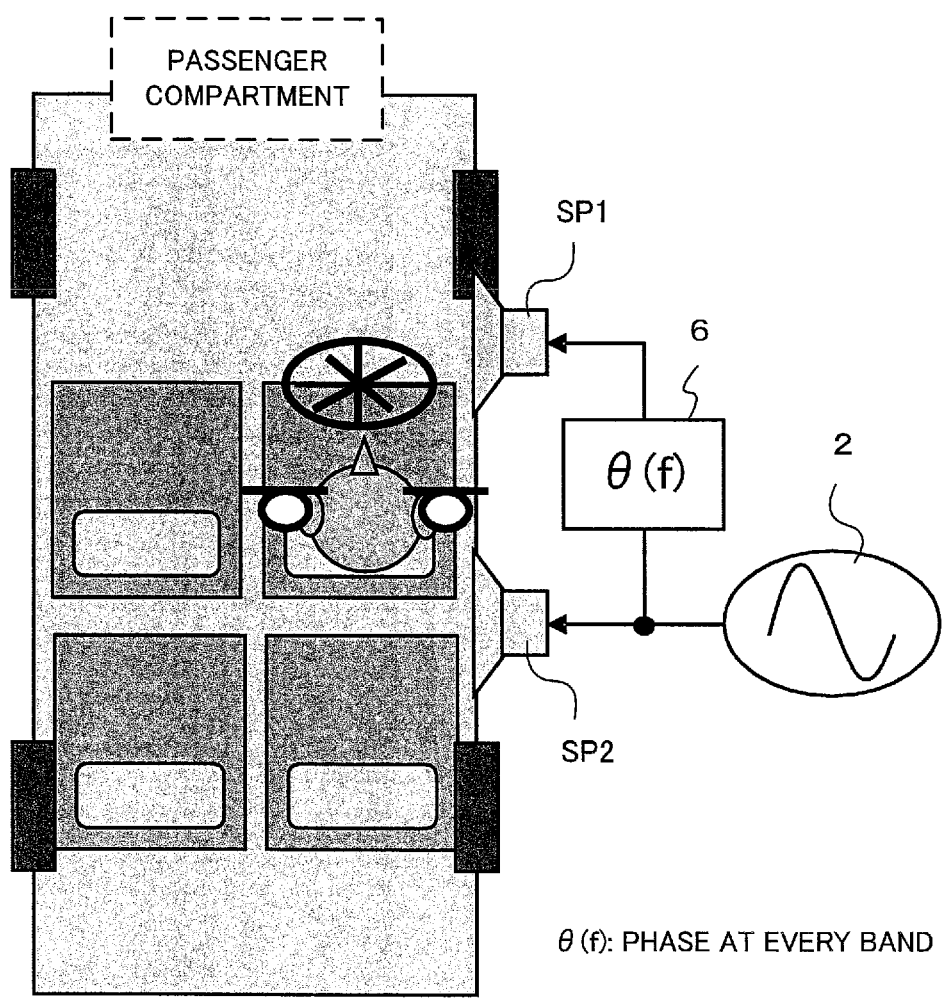
FIG. 7 illustrates a schematic configuration of a second embodiment of a sound reproduction device according to the present invention.

Next, a second embodiment will be described. FIG. 7 shows a schematic configuration of the sound reproduction device according to a second embodiment. The second embodiment assumes a passenger compartment as the acoustic space. As shown in FIG. 7, the front speaker SP1 and the rear speaker SP2 are arranged on the right side of the driver's seat. The sound signal from the sound source 2 is supplied to the rear speaker SP2 and is supplied to the front speaker SP1 after its phase is corrected by a phase correction unit 6. Here, the phase correction unit 6 gives a phase difference (a phase correction value) $\theta(f)$ in each of the frequency bands f of the sound signal.

Specifically, the phase difference $\theta(f)$ is set as follows:

$$\theta(f)=A+\alpha \quad (2)$$

Here, "A" is a phase value at which the both-ear level sum of the listener becomes maximum, and is calculated based on the transfer function between two speakers and two evaluation points. Specifically, the transfer function between each speaker and the both ears of the listener is obtained based on the positional relation between two speakers SP1, SP2 and the both ears (the evaluation points) of the listener, and the distribution of the both-ear level sum with respect to the phase and the frequency is generated based on the transfer function by simulation, as shown in FIG. 12B described later. Then, a line segment (the ling segment 34 in FIG. 12B) connecting the areas where the both-ear level sum is highest indicates the phase difference $\theta(f)$ for each frequency band.

Figure 8A:
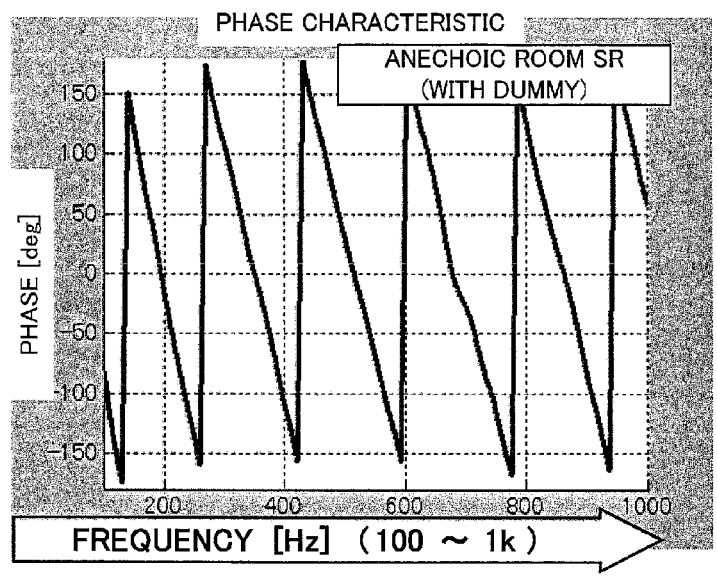
FIGS. 8A and 8B illustrate phase characteristics in an anechoic room and in a passenger compartment.
Figure 8B:
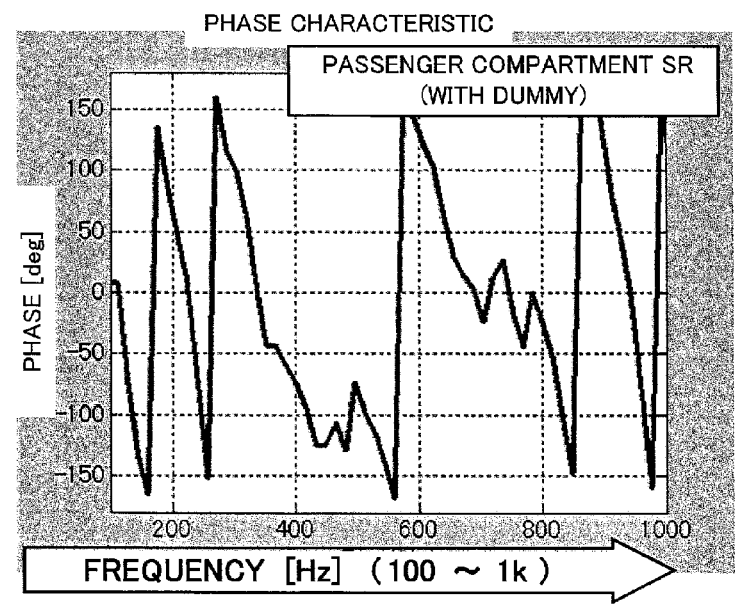

In the second embodiment assuming the passenger compartment as the acoustic space, the reason why the different phase difference $\theta(f)$ is given to the sound signals inputted to two speakers at each of the frequency bands is as follows. FIG. 8A shows a phase characteristic in an anechoic room, and FIG. 8B shows a phase characteristic in a certain passenger compartment. While a linear phase characteristic as shown in FIG. 8A is obtained in the anechoic room, the phase characteristic becomes complicated in an actual passenger compartment as shown in FIG. 8B because the reproduced sound is reflected by the window and/or shielded by an obstacle. Therefore, if the fixed delay amount Z is given in the entire frequency band like the first embodiment assuming the anechoic room as the acoustic space, there is a frequency band in which the both-ear level sum decreases. In this view, in the second embodiment, it becomes necessary to calculate the phase difference that maximizes the both-ear level sum for each of the frequency bands based on the transfer function between each speaker and two evaluation points and give the calculated phase difference to the sound signals inputted to two speakers.

By the method of the second embodiment, while the sound is reproduced by two speakers SP1 and SP2, the influence given to the passenger at the rear seat is small. Namely, the passenger at the rear seat does not feel the reproduced sound noisy by the following two reasons. The first reason is that the reproduced sound by the front speaker SP1 is basically difficult to reach the rear seat because there is a certain distance between the front speaker SP1 and the rear seat and an obstacle such as the driver's seat exists between the front speaker SP1 and the rear seat. The second reason is that the reproduced sounds by two speakers are difficult to synchronize with each other because the rear seat is located outside those two speakers. This will be described below with reference to FIGS. 9A and 9B.

Figure 9A:
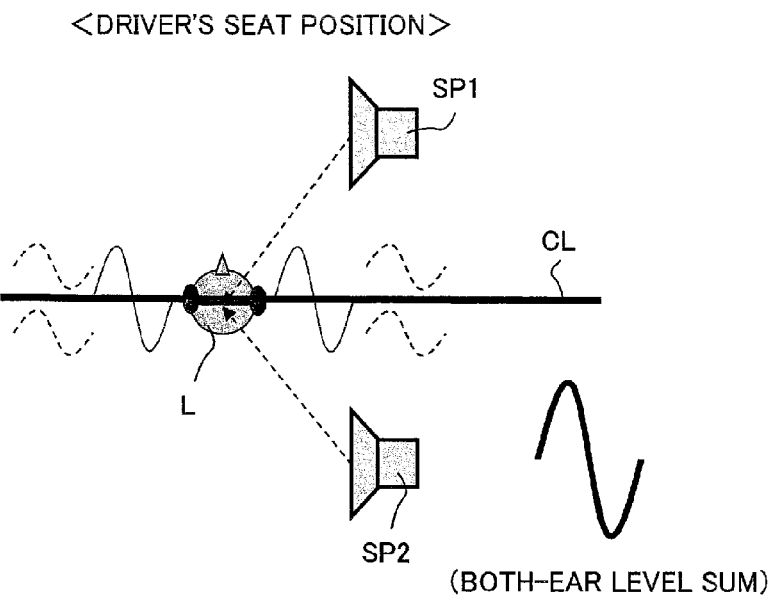
FIGS. 9A and 9B illustrate a relationship between an axis on which reproduced sounds by two speakers synchronize and a listening position.
Figure 9B:
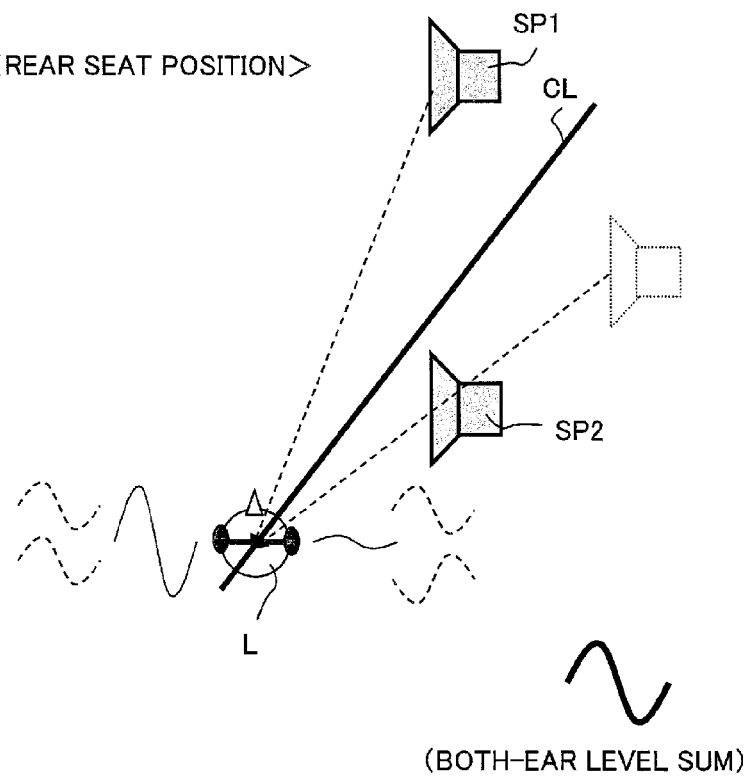

FIGS. 9A and 9B show the positional relation between two speakers and the listener L. As shown in FIG. 9A, when the sounds are reproduced by two speakers SP1 and SP2, the axis at which the reproduced sounds from two speakers synchronize with each other is the center line CL of two speakers. When the listener L is located inside two speakers, the both ears of the listener L is on or near the center line CL, and therefore the reproduced sounds reaching the both ears synchronize with each other and the both-ear level sum easily varies.

On the contrary, as shown in FIG. 9B, when the listener L is located outside two speakers SP1 and SP2, even if the listener L is located on the center line CL on which the reproduced sounds from two speakers synchronize with each other, the both-ear level sum hardly varies because the direction connecting the both ears of the listener deviates from the center line CL. Therefore, in the second embodiment, even if the sounds are reproduced by the front speaker SP1 and the rear speaker SP2, the sound pressure at the rear seat does not become excessively large and the passenger at the rear seat does not feel the reproduced sound noisy.

Next, "α" in the equation (2) of the phase difference θ(f) will be described. In the equation (2), "α" is in the following range:

$$-120°<\alpha<120° \quad (3)$$

Figure 10:
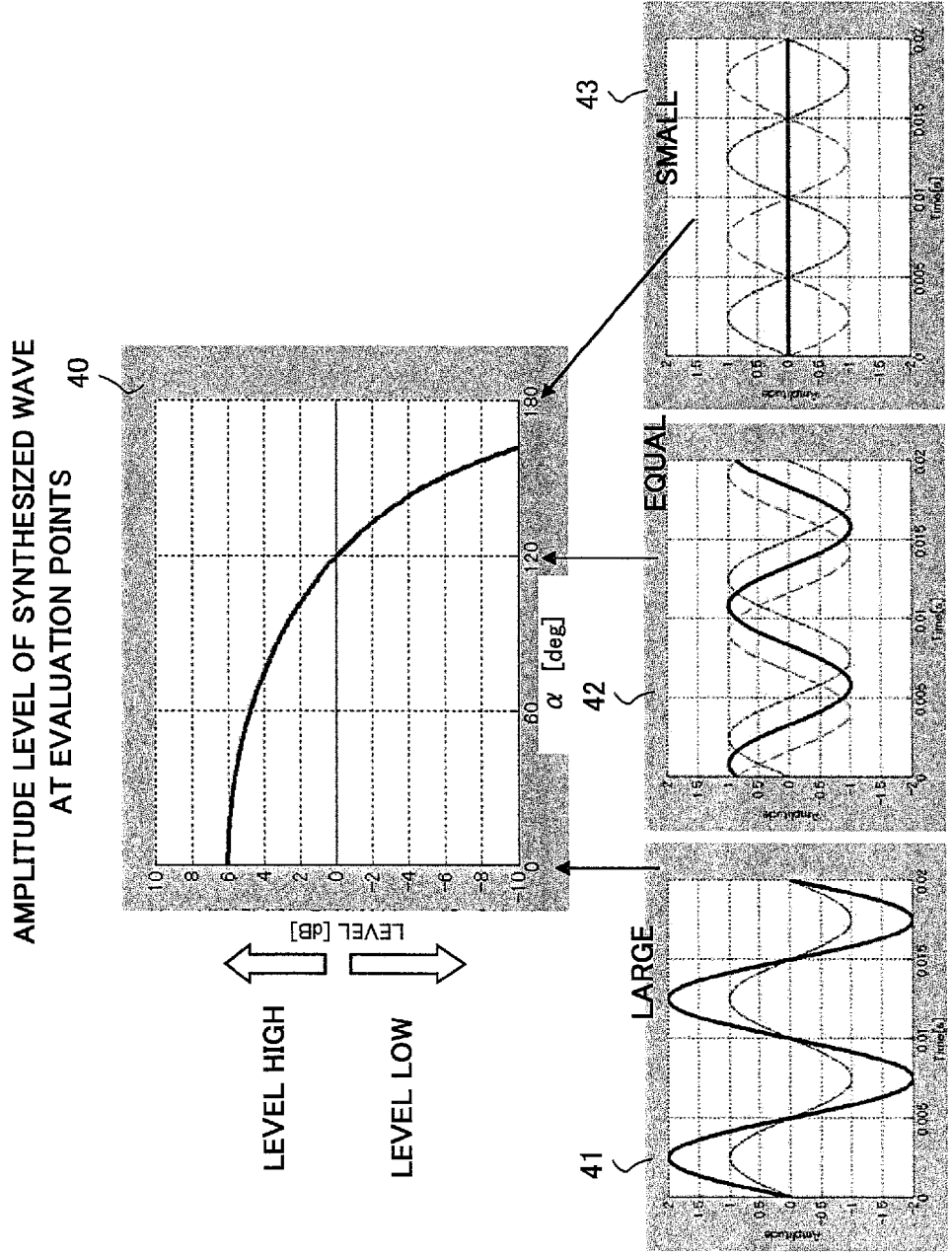
FIG. 10 illustrates amplitude levels of synthesized waves formed by synthesizing two sine waves with different phase difference.

This is because, if the amplitude of the speakers SP1 and SP2 are generally identical at the evaluation points and "α" is within the above range, the both-ear level sum at the driver's seat becomes larger than the both-ear level sum in the case where the sound is reproduced only by the rear speaker. This will be described with reference to FIG. 10. FIG. 10 shows the amplitude level of the synthesized wave created by synthesizing two sine waves with a different phase difference. When two sin waves are synthesized in-phase (the phase difference=0), the amplitude of the synthesized wave becomes twice the amplitude of the original sine wave as shown by the graph 41. When two sine waves are synthesized with the phase difference 120 degrees, the amplitude of two sine waves is equal to the amplitude of the synthesized wave. On the other hand, when two sine waves are synthesized with reversed phase (the phase difference=180 degrees), the amplitude of the synthesized wave becomes smaller than the amplitude of the original sine wave.

As shown by the graph 40, when the phase difference is 0-120 degrees, the amplitude of the synthesized wave of two sine waves is at least equal to or larger than the amplitude of the original sine wave. On the other hand, when the phase difference is larger than 120 degrees, the amplitude of the synthesized wave of two sine waves is smaller than the amplitude of the original sine wave.

Therefore, the both-ear level sum at the listening position becomes the largest when the phase difference θ(f) given to the signals supplied to two speakers satisfies α=0 (in phase), e.g., θ(f)=A. However, when α is within the range of ±120 degrees, the both-ear level sum can be at least larger than the case where the sound is reproduced only by the rear speaker. By this reason, the value of α is set to be within the range of ±120 degrees.

Even if the amplitudes of the sounds from the speakers SP1 and SP2 differ at the evaluation points, if the purpose is to increase the both-ear level sum at the driver's seat in comparison with the smaller one of the amplitude of the sounds from the speakers SP1 and SP2, the both-ear level sum can be surely increased by setting the value of α to be within the range of ±120 degrees.

Figure 11:
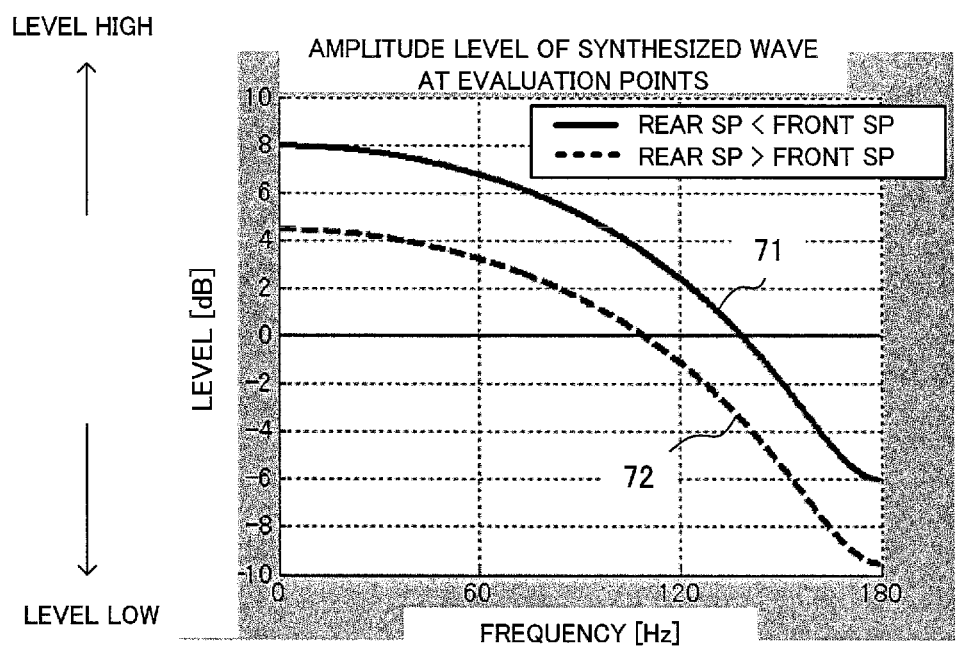
FIG. 11 illustrates amplitude levels of synthesized waves formed by synthesizing two sine waves with different phase difference.

The reason for this will be described with reference to FIG. 11. Similarly to FIG. 10, FIG. 11 shows the amplitude levels of the synthesized wave of two sine waves synthesized with different phase difference. It is noted that the amplitudes of the sine waves are not identical this case.

The solid line 71 shows the amplitude level in the case where the rear speaker is smaller than the front speaker, assuming that the level of the sound reproduced only by the rear speaker is a reference level (0 dB). Here, the level only by the rear speaker is equal to 3/2 times of the level only by the front speaker. From the solid line 71, it is understood that the range where the level of the synthesized wave becomes larger than the level of the sound reproduced only by the rear speaker is broader than 120 degrees. This is because, when the rear speaker is smaller than the front speaker, even if α is larger than 120 degrees and the two sine waves cancel with each other, and it becomes easy to maintain the state where the amplitude of the synthesized wave is large because the front speaker is larger than the rear speaker.

On the other hand, the broken line 72 shows the amplitude level of the synthesized wave in the case where the rear speaker is larger than the front speaker. Here, the level only by the rear speaker is equal to ⅔ times of the level only by the front speaker. Contrary to the case of the solid line 71, it is understood that the range where the level of the synthesized wave becomes larger than the level of the sound reproduced only by the rear speaker is narrower than 120 degrees.

Generally, if the purpose is to increase the both-ear level sum at the driver' seat in comparison with the level obtained by reproducing the sound only by one of SP1 and SP2 having smaller level, the both-ear level sum can be surely increased by setting the value of α within the range of ±120 degrees as shown by the solid line 71 in FIG. 11.

Figure 12A:
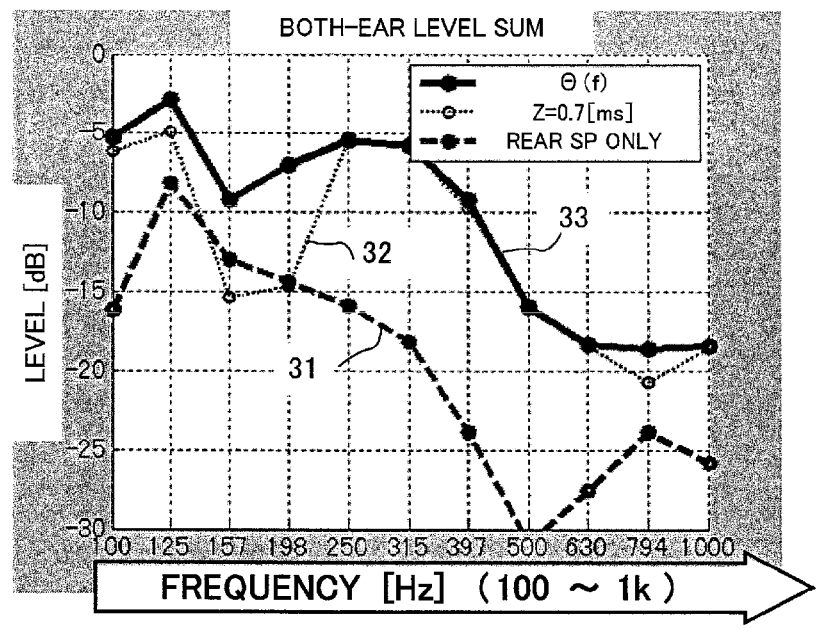
FIGS. 12A and 12B illustrate characteristics in the second embodiment.
Figure 12B:
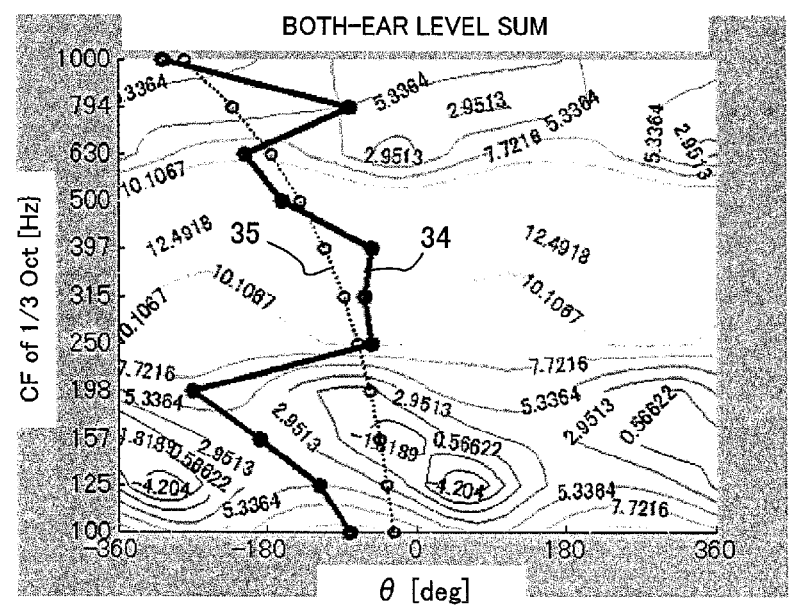

FIGS. 12A and 12B show characteristics in the second embodiment. Specifically, FIG. 12A shows the frequency characteristic of the both-ear level sum. In FIG. 12A, the graph 31 indicates the both-ear level sum in a case where the sound signal is inputted only to the rear speaker SP2. The graph 32 indicates the both-ear level sum in a case where the sound signals are inputted to two speakers SP1, SP2 and a fixed phase difference (Z=0.7 [ms]) is given to those sound signals. The graph 33 indicates the both-ear level sum in a case where the sound signals are inputted to two speakers and the phase difference θ(f) different at each frequency band is given to those sound signals.

The both-ear level sum (graph 33) in the case where the sound signals are inputted to two speakers with the phase difference θ(f) different at each frequency band is larger than the both-ear level sum (graph 31) in the case where the sound signal is inputted only to the rear speaker SP2 in the entire frequency band of 100 Hz-1 kHz. Also, the both-ear level sum (graph 32) in the case where the sound signals are inputted to two speakers with the fixed phase difference (Z=0.7 [ms]) is larger than the both-ear level sum (graph 31) in the case where the sound signal in inputted only to the rear speaker in the frequency range of 250-1 kHz, but is smaller than the both-ear level sum (graph 31) in the case where the sound signal is inputted only to the rear speaker SP2 in the frequency range of 130-200 Hz. This means that, in an acoustic space such as a passenger compartment, there may be a frequency band where the both-ear level sum becomes smaller when the sound signals are inputted to two speakers with a fixed phase difference. Therefore, in order to increase the both-ear level sum at a desired frequency band, it is necessary to give an appropriate phase difference to the sound signals inputted to two speakers at each frequency band.

FIG. 12B shows a relationship of the phase difference given to the sound signals inputted to two speakers and the frequency of the sound signals, with respect to the both-ear level sum. The solid line 34 shown in FIG. 12B, which indicates the both-ear level sum in the case where the phase difference θ(f) different at each frequency band is given to the sound signals inputted to two speakers, passes through the area where the both-ear level sum is large. The broken line 35 indicates the both-ear level sum in the case where the fixed phase difference (Z=0.7 [ms]) is given to the sound signals inputted to two speakers. Similarly to the graph 32 in FIG. 12A, the broken line 35 passes through the area where the both-ear level sum is large in the frequency range of 250-1 kHz, but passes through the area where the both-ear level sum is small in the frequency range of 130-200 Hz. Namely, FIG. 12B also indicates that, in order to increase the both-ear level sum in the entire frequency band of 100-1 kHz, it is necessary to give the appropriate phase difference θ(f) at each frequency band to the sound signals inputted to two speakers SP1, SP2.

Figure 13A:
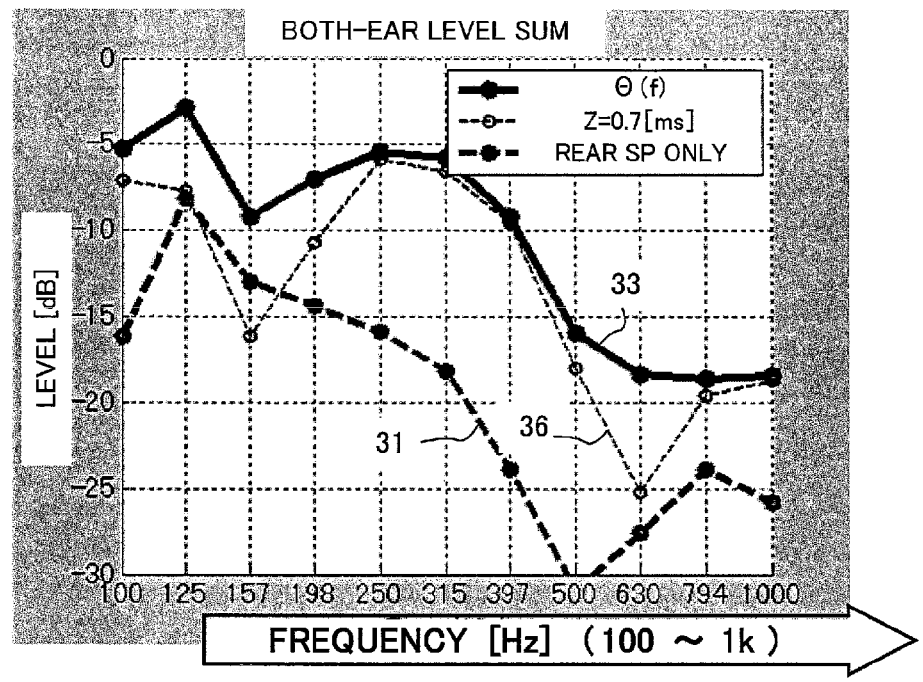
FIGS. 13A and 13B illustrate other characteristics in the second embodiment.
Figure 13B:
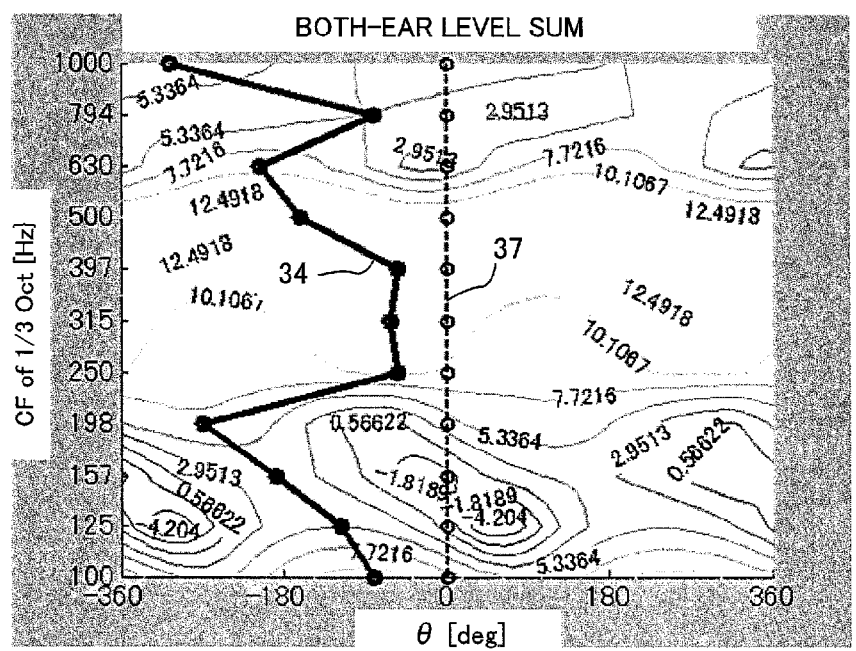

FIGS. 13A and 13B also show the characteristics in the second embodiment. FIG. 13A shows the frequency characteristic of the both-ear level sum. In FIG. 13A, the graph 31 and the graph 33 are the same as those in FIG. 12A. The graph 36 indicates the both-ear level sum in the case where the sound signals are inputted to two speakers SP1, Sp2 but the phase difference is not given to them (Z=0.0 [ms]).

The both-ear level sum (graph 36) in the case where the sound signals are inputted to two speakers without giving the phase difference (Z=0.0 [ms]) is larger than the both-ear level sum (graph 31) in the case where the sound signal is inputted only to the rear speaker SP2 in the frequency range of 200-1 kHz, but is smaller than the both-ear level sum (graph 31) in the case where the sound signal is inputted only to the rear speaker SP2 around the frequency range of 130-170 Hz. This means that, in the acoustic space such as the passenger compartment, there may be a frequency band in which the both-ear level sum decreases if the sound signals are inputted to two speakers without giving the phase difference. Therefore, in order to increase the both-ear level sum at the desired frequency band, it is necessary to give the appropriate phase difference different at each frequency band to the sound signals inputted to two speakers, as shown by the graph 33.

FIG. 13B shows the relationship of the phase difference given to the sound signals inputted to two speakers and the frequency of the sound signals, with respect to the both-ear level sum. The solid line 34 shown in FIG. 13B is the same as that shown in FIG. 12B. The broken line 37 indicates the both-ear level sum in the case where the phase difference is not given to the sound signals inputted to two speakers. Similarly to the graph 36 in FIG. 13A, the broken line 37 passes through the area where the both-ear level sum is large in the frequency range of 200-1 kHz, but passes through the area where the both-ear level sum is small in the frequency range of 130-170 Hz. Namely, FIG. 13B also indicates that, in order to increase the both-ear level sum in the entire frequency band of 100-1 kHz, it is necessary to give the appropriate phase difference θ(f) at each frequency band to the sound signals inputted to two speakers SP1, SP2.

Figure 14:
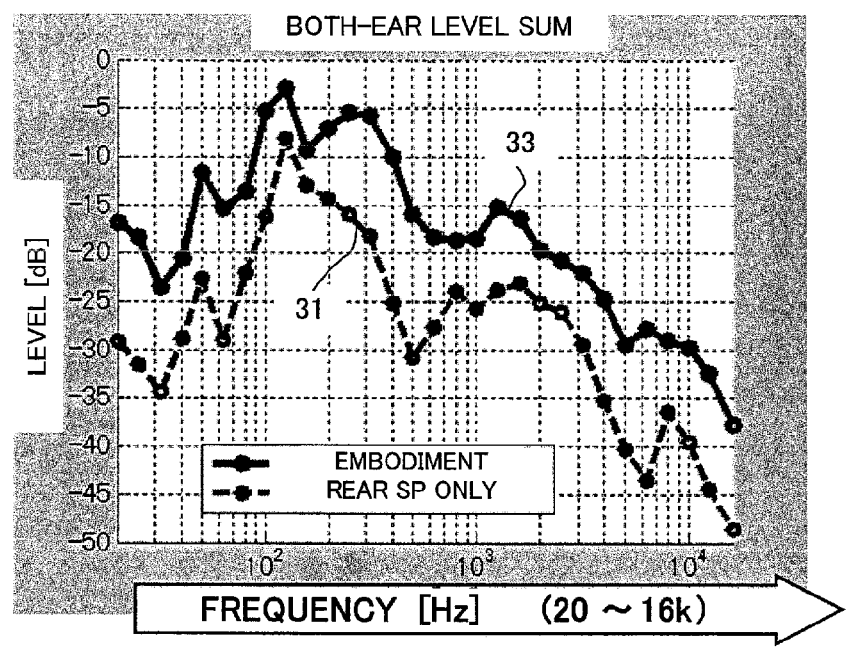
FIG. 14 illustrates another characteristic in the second embodiment.

FIG. 14 shows the frequency characteristic of the both-ear level sum in the frequency range of 20-16 kHz, i.e., a so-called audible band. Similarly to FIG. 12A, the graph 31 indicates the both-ear level sum in the case where the sound signal is inputted only to the rear speaker SP2. The graph 33 indicates the both-ear level sum in the case where the sound signals are inputted to two speakers and the phase difference θ(f) different at each frequency band is given to them. From FIG. 14, it is understood that the both-ear level sum can be increased in the entire audible band by giving the appropriate phase difference θ(f) at each frequency band to the sound signals inputted to two speakers.

Figure 15:
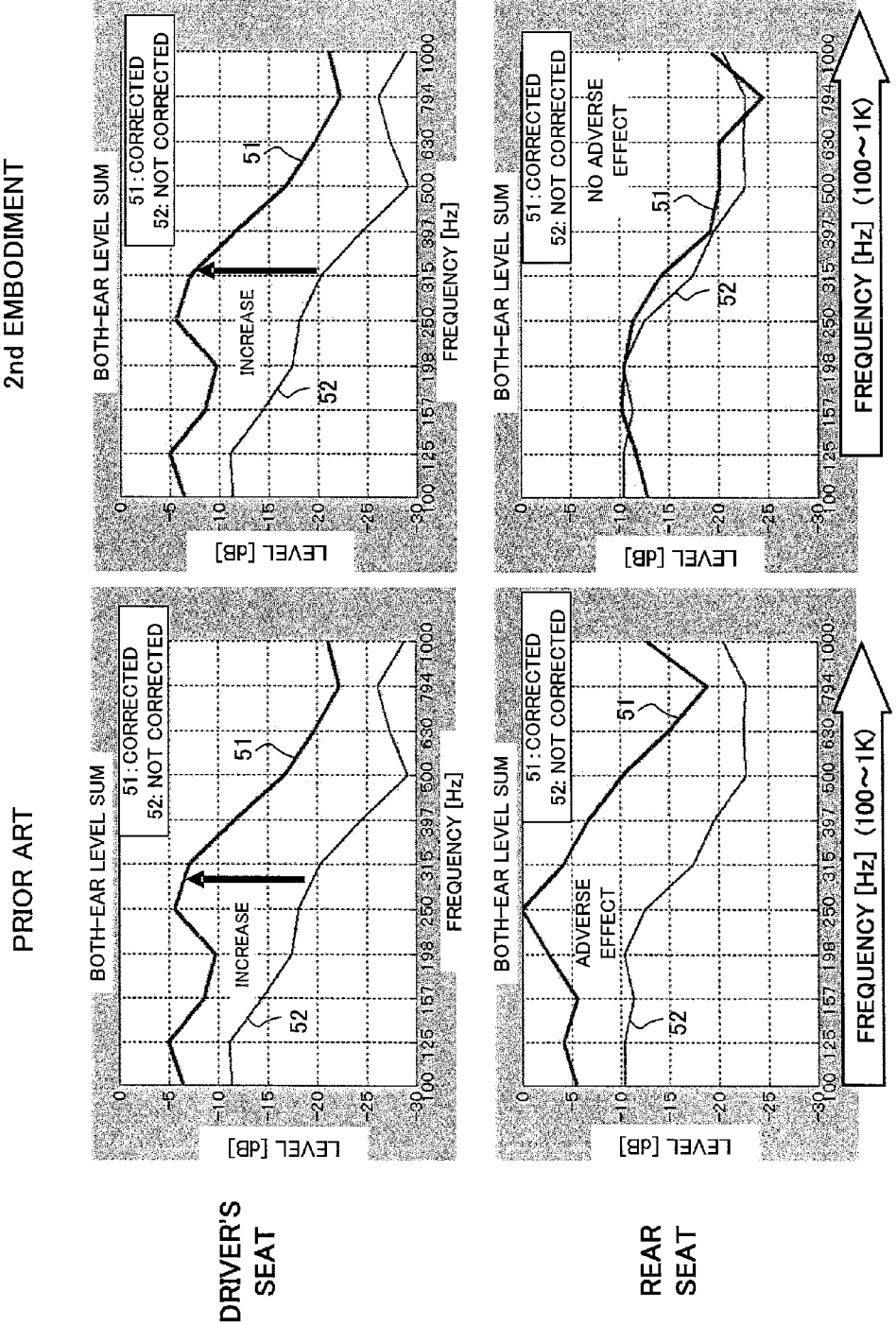
FIG. 15 illustrates an effect by the second embodiment in comparison with the prior art.

FIG. 15 shows graphs for explaining the effect of the second embodiment in comparison with the method of the prior art. Here, the method of the prior art is the method of increasing the reproduced sound by the rear speaker at a certain frequency band to increase the both-ear level sum at the driver's seat.

As shown by two graphs on the left side of FIG. 15, when the both-ear level sum at the driver's seat is increased by the method of the prior art, the both-ear level sum at the rear seat is further increased in comparison with the driver's seat, and there occurs such a disadvantage that the reproduced sound at the rear seat becomes too large. In contrast, as shown by two graphs on the right side of FIG. 15, if the both-ear level sum at the driver's seat is increased by the second embodiment, the both-ear level sum at the rear seat does not vary largely and there is no such disadvantage that the reproduced sound at the rear seat becomes too large. As described above, in the second embodiment, the reproduced sound level at the driver's seat can be increased without influencing the reproduced sound levels at other seats.

In the second embodiment described above, the both-ear level sum at the driver's seat, i.e., the front seat on the right side is increased by using the front speaker and the rear speaker arranged on the right side of the passenger compartment. By the same method, the both-ear level sum at the assistant driver's seat, i.e., the front seat on the left side may be increased by the front speaker and the rear speaker arranged on the left side of the passenger compartment.

INDUSTRIAL APPLICABILITY

This invention can be used for a sound reproduction device loaded on a vehicle.

DESCRIPTION OF REFERENCE NUMBERS

2 Sound Source
3 Dummy Head
4 Delay
6 Phase correction unit
SP1 Front Speaker
SP2 Rear Speaker
L Listening Position

The invention claimed is:
1. A sound reproduction device comprising:
a pair of speakers arranged in front of and behind two evaluation points set in an acoustic space, the two evaluation points corresponding to a left ear and a right ear of a listener of sound output from the sound reproduction device;
an input unit which receives one-channel sound signal; and
a phase control unit which controls a phase of the sound signal and supplies the sound signals to the pair of speakers,
wherein the phase control unit controls a phase difference of the sound signals supplied to the pair of speakers such that a sum of sound pressure levels at the two evaluation points corresponding to the left ear and the right ear of the listener is increased in relation to a sum of the sound pressure levels at the two evaluation points in a case where the sound signal is reproduced by only one of the pair of speakers without providing a delay amount.

2. The sound reproduction device according to claim 1, wherein the one of the pair of speakers is the speaker whose sum of the reproduced sound levels at the two evaluation points is smaller.

3. The sound reproduction device according to claim 1, wherein the phase control unit gives the phase difference different at each frequency band to the sound signals supplied to the pair of speakers.

4. The sound reproduction device according to claim 3, wherein the phase difference has a value within ±120 degrees from the phase difference in a case where the sum of the reproduced sound levels at the two evaluation points becomes maximum.

5. The sound reproduction device according to claim 1, wherein the phase control unit gives a delay of a fixed delay amount to the sound signals supplied to the pair of speakers in an entire frequency band.

6. The sound reproduction device according to claim 1, wherein one of the pair of speakers is arranged on an opposite side of the other of the pair of speakers with respect to a line segment connecting the two evaluation points.

7. The sound reproduction device according to claim 1,
wherein the sound space is a passenger compartment of a vehicle,
wherein the pair of speakers are a front speaker and a rear speaker arranged at a right side or a left side in the passenger compartment, and
wherein the two evaluation points correspond to positions of left and right ears of a listener positioned at a front seat in the passenger compartment.

8. A sound reproduction method executed by a sound reproduction device including a pair of speakers arranged in front of and behind two evaluation points set in an acoustic space, the two evaluation points corresponding to a left ear and a right ear of a listener of sound output from the sound reproduction device, the method comprising:
an input process which receives one-channel sound signal; and
a phase control process which controls a phase of the sound signal and supplies the sound signals to the pair of speakers,
wherein the phase control process controls a phase difference of the sound signals supplied to the pair of speakers such that a sum of sound pressure levels at the two evaluation points corresponding to the left ear and the right ear of the listener is increased in relation to a sum of sound pressure levels at the two evaluation points in a case where the sound signal is reproduced by only one of the pair of speakers without providing a delay amount.

9. A sound reproduction program stored in a non-transient tangible computer-readable medium and executed by a sound reproduction device including a pair of speakers arranged in front of and behind two evaluation points set in an acoustic space, the two evaluation points corresponding to a left ear and a right ear of a listener of sound output from the sound reproduction device, making the sound reproduction device function as:
an input unit which receives one-channel sound signal; and
a phase control unit which controls a phase of the sound signal and supplies the sound signals to the pair of speakers,
wherein the phase control unit controls a phase difference of the sound signals supplied to the pair of speakers such that a sum of sound pressure levels at the two evaluation points corresponding to the left ear and the right ear of the listener is increased in relation to a sum of sound pressure levels at the two evaluation points in a case where the sound signal is reproduced by only one of the pair of speakers without providing a delay amount.

10. The sound reproduction device according to claim 1, wherein the phase control unit controls, at each frequency band, the phase difference causing the sum of the sound pressure levels to become larger than the sum in the case where the sound signal is reproduced by only one of the pair of speakers.

11. The sound reproduction device according to claim 1, wherein the phase control unit controls the phase difference of the sound signals supplied to the pair of speakers at each frequency band such that the sum of the sound pressure levels becomes larger than the sum in the case where the sound signal is reproduced by only one of the speakers in an entire audible band.

* * * * *